(12) United States Patent
Ngo et al.

(10) Patent No.: US 9,736,086 B1
(45) Date of Patent: Aug. 15, 2017

(54) MULTI-FUNCTION, MULTI-PROTOCOL FIFO FOR HIGH-SPEED COMMUNICATION

(75) Inventors: Huy Ngo, San Jose, CA (US); Keith Duwel, San Jose, CA (US); Vinson Chan, San Jose, CA (US); Divya Vijayaraghavan, Los Altos, CA (US); Curt Wortman, Milpitas, CA (US)

(73) Assignee: Altera Corporation, San Jose, CA (US)

( * ) Notice: Subject to any disclaimer, the term of this patent is extended or adjusted under 35 U.S.C. 154(b) by 258 days.

(21) Appl. No.: 13/098,361

(22) Filed: Apr. 29, 2011

(51) Int. Cl.
*H04L 12/861* (2013.01)

(52) U.S. Cl.
CPC .................................. *H04L 49/90* (2013.01)

(58) Field of Classification Search
None
See application file for complete search history.

(56) References Cited

U.S. PATENT DOCUMENTS

| | | | | |
|---|---|---|---|---|
| 5,406,554 A * | 4/1995 | Parry | ............................. | 370/381 |
| 5,701,417 A * | 12/1997 | Lewis et al. | .................. | 709/222 |
| 6,005,412 A * | 12/1999 | Ranjan et al. | .................. | 326/63 |
| 6,049,223 A * | 4/2000 | Lytle | ................ | H03K 19/17736 |
| | | | | 326/38 |
| 6,057,704 A * | 5/2000 | New | ................ | H03K 19/17756 |
| | | | | 326/38 |
| 6,615,370 B1 * | 9/2003 | Edwards et al. | ................ | 714/45 |
| 6,745,264 B1 * | 6/2004 | Luke et al. | ...................... | 710/52 |
| 7,159,135 B2 * | 1/2007 | Jacobs | ........................... | 713/400 |
| 7,323,903 B1 * | 1/2008 | Lee et al. | ......................... | 326/40 |
| 7,574,635 B1 * | 8/2009 | Alfke | ............................. | 714/719 |
| 8,275,910 B1 * | 9/2012 | Hauck | ................... | H04J 3/0697 |
| | | | | 370/516 |
| 8,942,248 B1 * | 1/2015 | Cheung | ................. | H04L 7/0041 |
| | | | | 370/412 |
| 2002/0072382 A1 * | 6/2002 | Fong et al. | .................... | 455/507 |
| 2002/0105966 A1 * | 8/2002 | Patel | .................... | H04L 12/5693 |
| | | | | 370/463 |
| 2002/0178411 A1 * | 11/2002 | Kohda | ........................... | 714/712 |
| 2002/0181641 A1 * | 12/2002 | Wingen | ......................... | 375/377 |
| 2002/0190751 A1 * | 12/2002 | Lee et al. | ......................... | 326/39 |
| 2003/0005025 A1 * | 1/2003 | Shavit et al. | .................. | 709/102 |
| 2004/0225779 A1 * | 11/2004 | Zhao et al. | .................... | 710/200 |
| 2004/0228429 A1 * | 11/2004 | Schanke | ................ | H04J 3/0629 |
| | | | | 375/372 |
| 2005/0055592 A1 * | 3/2005 | Velasco et al. | ................ | 713/322 |
| 2005/0086462 A1 * | 4/2005 | Vorbach | ......................... | 713/100 |
| 2005/0198405 A1 * | 9/2005 | Newman | ............................ | 710/1 |
| 2006/0020718 A1 * | 1/2006 | Duresky et al. | ................. | 710/11 |
| 2006/0095613 A1 * | 5/2006 | Venkata et al. | .................. | 710/62 |
| 2006/0190638 A1 * | 8/2006 | Castlebary | ....................... | 710/52 |
| 2006/0256636 A1 * | 11/2006 | Bahl et al. | ...................... | 365/221 |
| 2007/0011368 A1 * | 1/2007 | Wang et al. | .................... | 710/52 |
| 2007/0067487 A1 * | 3/2007 | Freebairn et al. | ............. | 709/238 |

(Continued)

*Primary Examiner* — Christopher Wyllie
(74) *Attorney, Agent, or Firm* — Fletcher Yoder P.C.

(57) ABSTRACT

Systems and methods are disclosed for buffering data using a multi-function, multi-protocol first-in-first-out (FIFO) circuit. For example, a data buffering apparatus is provided that includes a mode selection input and a FIFO circuit that is operative to buffer a data signal between a FIFO circuit input and a FIFO circuit output, wherein the FIFO circuit is configured in an operating mode responsive to the mode selection signal.

19 Claims, 11 Drawing Sheets

(56) References Cited

U.S. PATENT DOCUMENTS

| | | | |
|---|---|---|---|
| 2007/0079241 A1* | 4/2007 | Wang | G11B 20/00992 715/727 |
| 2008/0318588 A1* | 12/2008 | Parkvall | H04W 16/06 455/452.1 |
| 2009/0010092 A1* | 1/2009 | Fujisawa | G11C 7/1018 365/236 |
| 2009/0055677 A1* | 2/2009 | Chen | 713/600 |
| 2009/0075668 A1* | 3/2009 | Rao | H04W 72/1221 455/452.2 |
| 2009/0287952 A1* | 11/2009 | Patel et al. | 714/2 |
| 2012/0039263 A1* | 2/2012 | Moberg | H04W 72/1284 370/329 |
| 2012/0214402 A1* | 8/2012 | Shany | H04K 3/43 455/1 |
| 2013/0163532 A1* | 6/2013 | Anderson | H04W 72/04 370/329 |

* cited by examiner

MULTI-FUNCTION, MULTI-PROTOCOL FIFO FOR HIGH-SPEED COMMUNICATION

BACKGROUND OF THE DISCLOSURE

Programmable logic resource technology is well known for its ability to allow a common hardware design (embodied in an integrated circuit) to be programmed to meet the needs of many different applications. To facilitate the use of programmable logic resources in certain applications, component blocks are coupled to programmable logic resource core circuitry. In one application, a component block is a block of logic or data that supports a communication or signaling protocol. These signaling protocols vary with respect to such parameters as clock signal frequency, header configuration, packet size, data word length, number of parallel channels, etc. Such signaling protocols can include, for example, industry-standard forms such as 10GBASE-R Ethernet, Interlaken, SFI-S, CPRI, etc., and any of a wide range of non-industry-standard or "custom" forms that particular users devise for their own uses. Custom protocols often have at least some features similar to industry-standard protocols, but deviate from industry standards in other respects.

There is increasing interest in using signaling protocols for high-speed communication between various devices in systems. For example, the devices in a system may be various integrated circuits that are mounted on a printed circuit board ("PCB"). The high-speed communication between the devices in such a system may take place via circuit traces on the PCB. One or more of the devices may be a PLD or that general type of relatively general-purpose, programmable or configurable device. All such devices to which the invention can be applied may sometimes be referred to generically as PLDs. This terminology is employed solely for convenience and is not intended to limit the invention to any particular narrow class of devices.

High-speed data communication may be supported on a PLD by including on the PLD some circuitry that is dedicated to performing certain tasks associated with such communication. Such dedicated circuitry may be referred to as a specialized block. The specialized block circuitry may be controllable, programmable, or configurable in some respects to adapt or customize it to particular communication protocols. Specialized blocks (rather than the general-purpose logic of the PLD) may be used for some aspects of high-speed communication for any of several reasons. These may include the need to provide higher-speed circuitry to keep up with the extremely fast bit rates of the communication, the large number of general-purpose logic elements that would be required to perform some of the complex encoding/decoding tasks required for some high-speed communication protocols, etc.

An important component in the circuitry required for many communication systems is a first-in-first-out ("FIFO") circuit. FIFO circuits are used to buffer data between different systems, which may operate at the same or different clock frequencies. A FIFO typically includes read and write address pointers, a RAM to store data, and logic to generate status signals. Existing PLDs often contain a single FIFO block which is "hard-wired" for a particular protocol or function that imposes specific interface and clocking constraints on the user side. If multiple different protocols are desired, the PLD may repeat the single-FIFO architecture and include multiple different FIFO blocks, each specifically dedicated to a single protocol or use. Such a PLD would require separate user logic to interface with each of these blocks, which can be both redundant and cumbersome for the user. Additionally, such an architecture has a large footprint within the PLD.

SUMMARY OF THE DISCLOSURE

The present disclosure relates to systems and methods for providing first-in-first-out (FIFO) circuits. There are many communication protocols that are known for use in high-speed data communication. It is desirable for a PLD (which is intended to be a relatively general-purpose device) to be useful in a number of different possible applications. For example, it may be desirable to provide a PLD that can support many different high-speed data communication protocols. Those protocols may include industry-standard protocols and protocols that a user may design on a customized basis. The FIFO circuits described herein allow a single FIFO block to be configured in any of a number of operating modes to support any of a number of communication protocols. Physically, these multi-protocol, multi-mode FIFO circuits enable user logic to interface to a single FIFO block, resulting in a cleaner interface on the PLD side. Additionally, the FIFO circuits provide clocking flexibility to users, enabling a wide range of applications. The FIFO circuits may also advantageously achieve significant area reduction of the PCS, improving performance in high-bandwidth transceiver applications.

In accordance with the invention, FIFO circuitry is provided that buffers data between systems. A FIFO circuit can be provided on a component block on a programmable logic resource. The component block can be a module-configurable block where the circuit is programmed using a software module, a specialized block where the circuit is custom-designed in hardware, or a combination of the same (e.g., a firm block). Although the invention is described herein primarily in the context of a FIFO circuit provided on a programmable logic resource for clarity and specificity, the circuit can be provided on any suitable device such as, for example, an application-specific standard product (ASSP), an application-specific integrated circuit (ASIC), a full-custom chip, or a dedicated chip.

Therefore, in accordance with certain embodiments, a data buffering apparatus is provided, including a mode selection input that receives a mode selection signal and a first-in-first-out (FIFO) circuit that is operative to buffer a data signal between a FIFO circuit input and a FIFO circuit output. The FIFO circuit is configured in an operating mode, selected from a plurality of operating modes, responsive to the mode selection signal.

In some embodiments, the plurality of operating modes includes a clock compensation mode. When the FIFO circuit is configured according to the clock compensation mode, the FIFO circuit may insert a user-selectable character into the data signal or delete a user-selectable character from the data signal. A FIFO circuit configured according to the asynchronous mode may provide low skew alignment for a multi-channel communication protocol. In some embodiments, the plurality of operating modes includes a deskew mode. When the FIFO circuit is configured according to the deskew mode, the FIFO circuit may remove control words from a data frame within the data signal prior to buffering the data signal. In some embodiments, the plurality of operating modes includes a phase compensation mode. When the FIFO circuit is configured according to the phase compensation mode, the FIFO circuit may buffer the data signal according to a write clock and a read clock that operate at substantially the same frequency. A FIFO circuit configured according to the phase compensation mode may provide low skew alignment for a multi-channel communication protocol. In some embodiments, the plurality of operating modes includes an asynchronous mode and/or a register mode.

There is also provided a programmable logic device, including programmable logic device core circuitry and a specialized logic block that supports a plurality of communications protocols. The specialized logic block is coupled to the programmable logic device core circuitry, and includes first-in-first-out (FIFO) circuitry that is configurable in a plurality of operating modes. When the specialized logic block is configured in a particular operating mode, the specialized logic block is operative to buffer a data signal transmitted according to at least one of the supported communications protocols. In some embodiments, the plurality of communications protocols includes 10GBASE-R and Interlaken. The FIFO circuit may buffer the data signal according to read and write clocks that operate at different frequencies, or read and write clocks that operate at substantially the same frequency. In some embodiments, the configuration of the FIFO circuitry is responsive to an operating mode selection signal.

There is also provided a method for buffering data. A mode selection signal is received, and a first-in-first-out (FIFO) circuit is configured in an operating mode in response to the mode selection signal. The FIFO circuit buffers data between a FIFO input and a FIFO output according to the operating mode. The operating mode may be associated with a high-speed communications protocol, and data may be buffered between the FIFO input and output according to the high-speed communications protocol. In some embodiments, the FIFO circuit is provided on a component block on a programmable logic device. In some embodiments, the mode selection signal is transmitted in a configuration data stream.

BRIEF DESCRIPTION OF THE DRAWINGS

Further features of the disclosure, its nature and various advantages will be apparent upon consideration of the following detailed description, taken in conjunction with the accompanying drawings, in which like reference characters refer to like parts throughout, and in which.

DETAILED DESCRIPTION OF THE INVENTION

Figure 1:
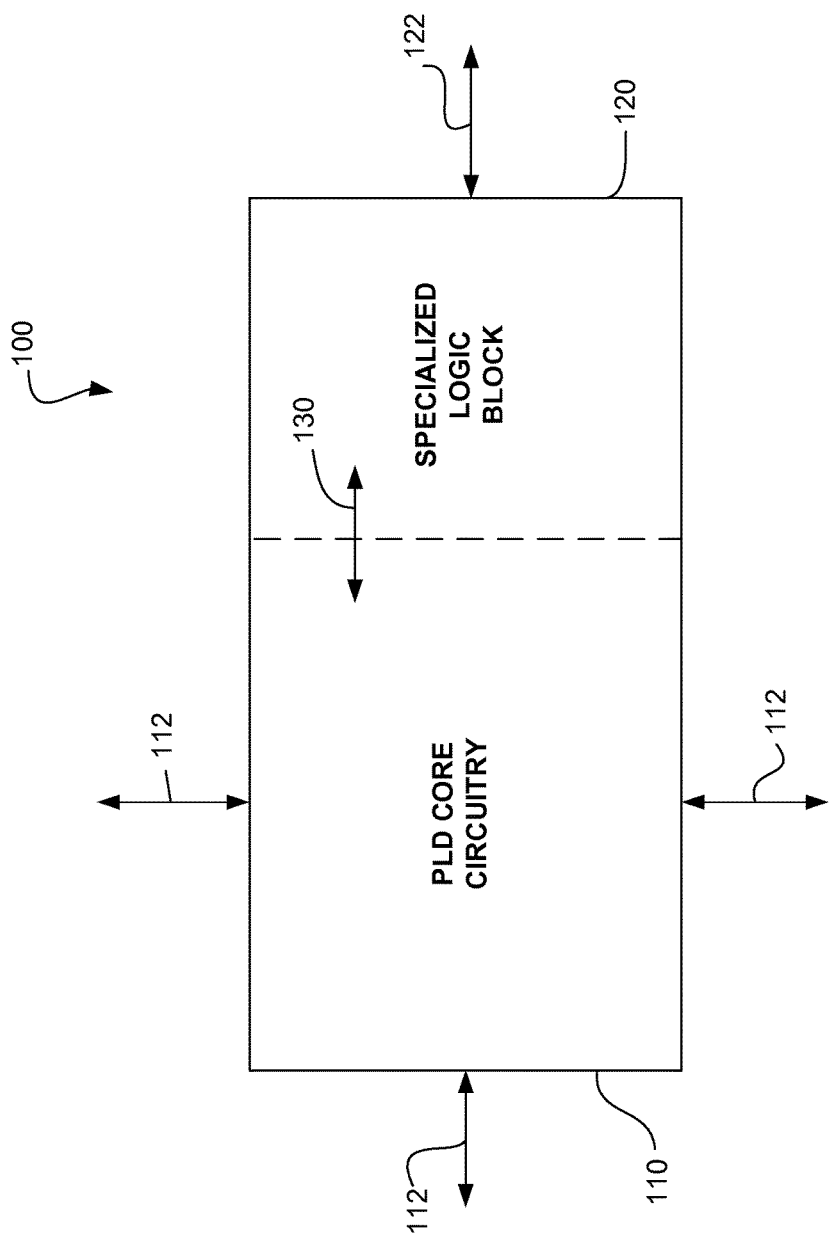
FIG. 1 is a simplified block diagram of an illustrative embodiment of a programmable logic device.

An illustrative programmable logic device (PLD) 100 constructed in accordance with the invention is shown in FIG. 1. PLD 100 is an integrated circuit that includes programmable logic device core circuitry 110 and a specialized logic block 120. Programmable logic device core circuitry 110 can be general purpose programmable logic circuitry of any of several known types and constructions. Specialized logic block 120 can be a module-configurable block in which circuitry is programmed using a software "module" that may be pre-written to configure programmable logic to perform a particular function or serve a particular purpose. Circuitry is described in terms of gates and interconnections for the gates using a netlist or a hardware description language (e.g., Very High Speed Integrated Circuit Hardware Description Language (VHDL) or Verilog), which can be synthesized with the surrounding logic. In another embodiment, specialized logic block 120 can be a specialized block in which circuitry is custom-designed in hardware. In yet another embodiment, specialized logic block 120 can be a firm block in which circuitry is partly designed in hardware but is configurable via software for various applications. Although the embodiments disclosed herein are primarily discussed within the context of a multi-protocol, multi-function FIFO provided on a programmable logic device for clarity, such FIFOs can be provided on any suitable device such as, for example, an application-specific standard product (ASSP), an application-specific integrated circuit (ASIC), a full-custom chip, or a dedicated chip. It should also be understood that PLD 100 may be a combination of devices, such as an FPGA and an ASIC, and/or may include additional, stand-alone circuit components.

In accordance with this disclosure, specialized logic block 120 is configured to support, for example, a communications protocol with high-speed communications circuitry. The high-speed communications circuitry is used to receive one or more high-speed signals via connection(s) 122 and to pass the information thus received on to programmable logic resource core circuitry 110 in a form that is more readily usable by the core circuitry. Alternatively or additionally, specialized logic block 120 may be used to output via connection(s) 122 one or more signals indicative of information received from programmable logic device core circuitry 110. Leads 130 are used to convey signals between programmable logic device core circuitry 110 and specialized logic block 120. Programmable logic device core circuitry 110 may also input and/or output other signals via leads 112.

For clarity, FIFO circuits are described herein primarily in the context of the specialized logic block 120 being a part of a communication system for illustration purposes only and not intended to limit the scope of the present invention. The principles of this disclosure are applicable to many communication standards that employ FIFO memory structures. Examples of standards that may be supported include 10GBASE-R, Interlaken, SFI-S, CPRI, and many non-industry-standard protocols that are modifications of industry-standard protocols. Some users may sometimes wish to devise and employ such variants of industry standards, and many such variants can be supported by the FIFOs disclosed herein. For some standards, a FIFO and other communication components may be fully implementable in specialized logic block 120. For other standards, part of the interface may be implemented in specialized logic block 120 and part of the interface may be implemented in PLD core circuitry 110.

Figure 2:
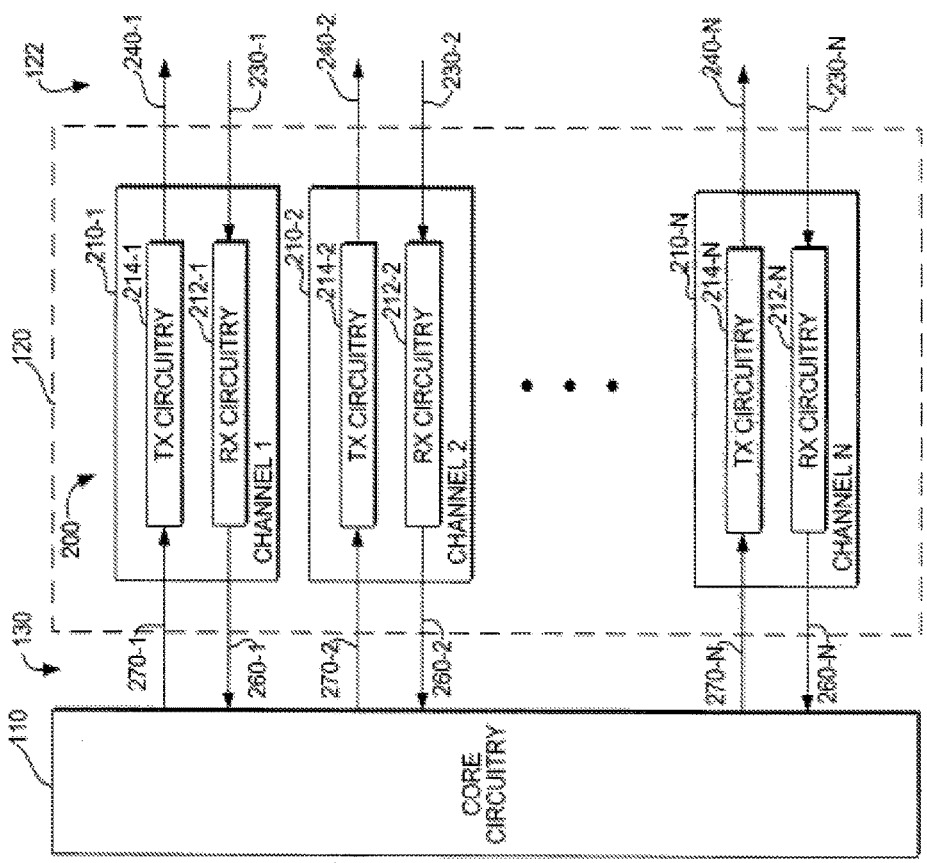
FIG. 2 is a more detailed, but still simplified block diagram of a representative portion of the programmable logic device shown in FIG. 1.

FIG. 2 shows a partial block diagram of PLD 100 having communication circuitry 200 in specialized logic block 120. Communication circuitry 200 includes up to N channels 210. The number of channels N may vary depending on the communications protocol. Each channel 210 includes receiver circuitry 212 and transmitter circuitry 214.

Each receiver circuitry 212 may receive data from external circuitry via associated receiver (RX) signal 230 and may partly convert the received data to a form more suitable for application to PLD core circuitry 110. The converted data may be transmitted to the PLD core circuitry 110 via leads 260. For example, each receiver circuitry 212 can receive from external circuitry successive serial bytes of 66 bits each (because of 64B/66B encoding), and can output to PLD core circuitry 110 successive parallel bytes of 64 bits each.

Each transmitter circuitry 214 may receive data from PLD core circuitry 110 via associated lead 270 and may partly convert the received data to a form more suitable for application to external circuitry. The converted data may be transmitted to the external circuitry via transmitter signals 240. For example, each transmitter circuitry 214 can receive from PLD core circuitry 110 successive parallel bytes of 64 bits each, and can output to external circuitry successive serial bytes of 66 bits each.

Receiver circuitry 212 may include, for example, gearbox circuitry, block synchronizers, disparity checkers, descramblers, frame synchronizers, bit-error rate (BER) monitors, decoders and receive state machines (SMs), error checkers, deserializers, clock data recovery (CDR) circuitry and first-in first-out (FIFO) circuits as described herein. Transmitter circuitry 214 may include, for example, FIFO circuits, error checkers, and gearbox circuitry, as well as serializers, frame generators, error checkers, encoders and transmit SMs, scramblers, and disparity generators.

Figure 3:
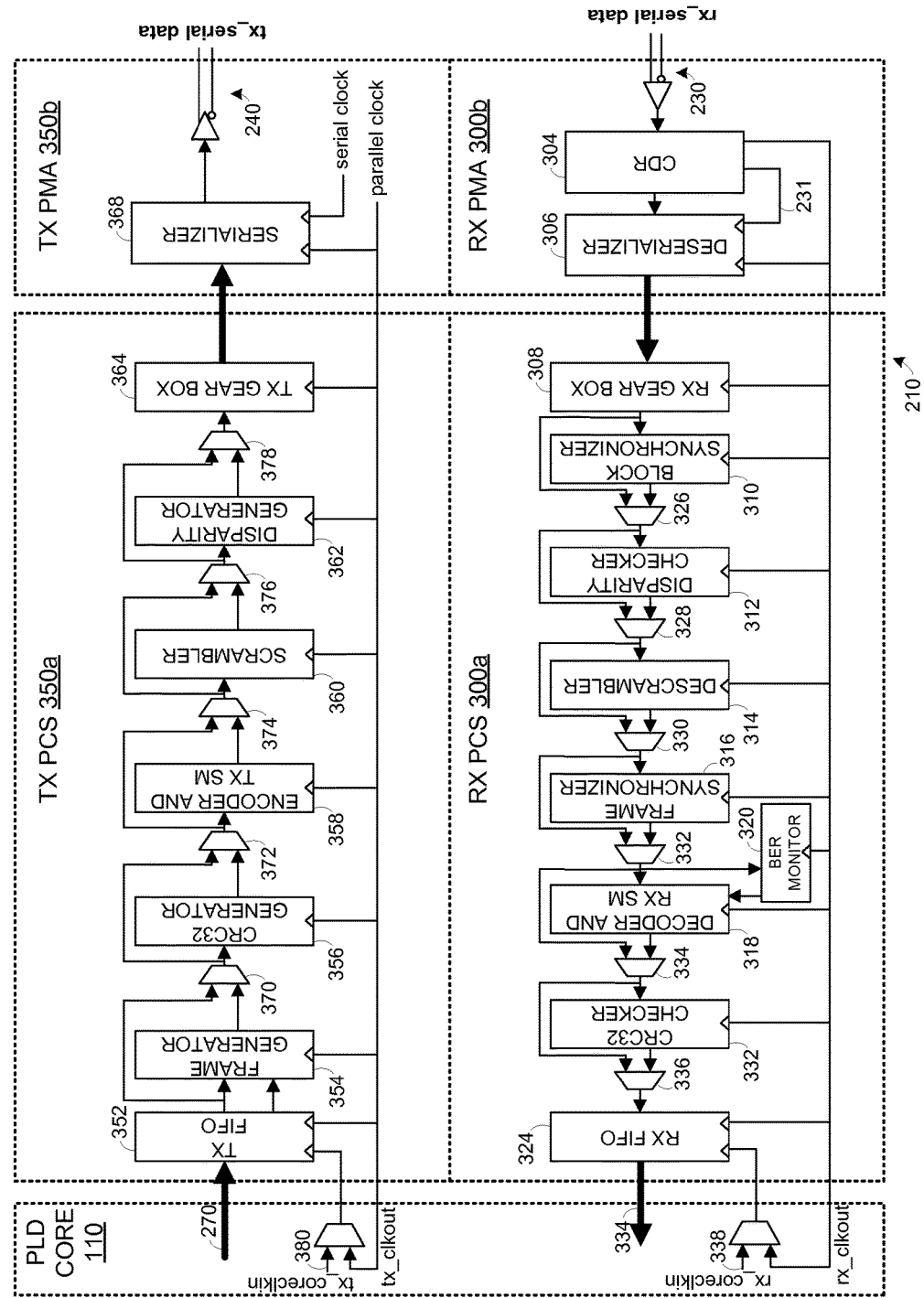
FIG. 3 is a simplified block diagram of transmitter and receiver circuitry in a representative portion of the circuitry shown in FIG. 2.

FIG. 3 is a more detailed block diagram of a channel 210 in communication circuitry 200. In particular, channel 210 represents an embodiment in which the interconnection is modeled as two sections: the physical coding sub-layer (PCS) and the physical medium attachment sub-layer (PMA). The PCS often includes the digital processing section of the protocol; for example, data encoding. The PMA often includes the analog processing and receives/transmits highs-speed data streams. In FIG. 3, channel 210 includes receiver circuitry 300 that includes PCS receiver circuitry 300*a* and PMA receiver circuitry 300*b*. Channel 210 also includes transmitter circuitry 350 that includes PCS transmitter circuitry 350*a* and PMA transmitter circuitry 350*b*.

PMA receiver circuitry 300*b* includes CDR circuitry 304 and a deserializer 306. PCS receiver circuitry 300*a* includes receive ("RX") gearbox circuitry 308, a block synchronizer 310, a disparity checker 312, a descrambler 314, a frame synchronizer 316, a decoder and RX state machine (SM) 318, a BER monitor 320, a CRC32 checker 322, and an RX FIFO 324, as well as multiplexers 326-336. Receiver circuitry 300 receives as input a serial data signal 230 from external circuitry and a receiver clock signal 338 from PLD core circuitry 110. Receiver circuitry 300 sends as output a data signal 334 to PLD core circuitry 110.

CDR circuitry 304 receives data from external circuitry via serial data signal 230. CDR circuitry 304 recovers a clock signal 231 from the serial data signal 230 and transmits that clock signal to deserializer 306. CDR circuitry 304 may also include a buffer (not shown) that receives the serial data and performs any of a number of pre-processing steps, such as adjusting DC gain. The serial data is sent to deserializer 306. Deserializer 306 accumulates successive bytes of data and outputs the data in parallel. The width of the parallel data path output from deserializer 306 can vary according to the application (e.g., using 8-bit to 40-bit deserialization factors). The parallel data is sent as input to RX gear box 308.

RX gear box 308 is an interface element that adapts data from one data path width to a different data path width (here, the width of the PMA receiver data path to the width of the PCS receiver data path). Often, the PMA data width is smaller than the bus width for interfacing with the PCS, so RX gear box 308 increases the data bus width from the PMA to the PCS. The relationship between the data path widths is referred to as the gear box ratio. For example, data in the analog PMA sub-layer may use a data path width of 40 bits while data in the PCS sub-layer may be transmitted in a data path with a width of 66 bits (e.g., when the 10GBASE-R communication protocol is used). A 40:66 gear box adapts the 40-bit wide data from the PMA sub-layer into 66-bit wide data for the PCS sub-layer. When the Interlaken communication protocol is used, the RX gear box 308 may adapt the 40-bit wide data from the PMA sub-layer into 67-big wide data for the PCS sub-layer. The gearbox ratio may also indicate the relationship between the clocks that control operations on either side of the interface. For example, the 10GBASE-R communication protocol transmits data at 10.3125 GBps. If the width of the data path in the PMA layer is 40 bits, the PMA clock will run at 10.3125 GBps/40 bits=258 MHz. If the width of the data path in the PCS is 66 bits, the clock on the other side of the PMA-PCS gearbox should operate at approximately 156 MHz. As described in detail below, the multi-protocol, multi-mode FIFOs described herein can be configured in a clock compensation mode to improve performance when different clock frequencies are used (on either side of a gearbox or in other situations). The resized data output by RX gear box 308 is sent to block synchronizer 310 and multiplexer 326.

Block synchronizer 310 identifies the boundaries between words transmitted from RX gear box 308. For example, when the 10GBASE-R communication protocol is used, block synchronizer 310 identifies boundaries between the 66-bit words that are defined in the 10GBASE-R protocol specification. In another example, when the Interlaken communication protocol is used, block synchronizer 310 identifies boundaries between the 67-bit words that are defined in the Interlaken protocol specification. Block synchronizer 310 may also generate status signals that can be used by components in the receiver circuitry 300 and/or in the PLD core circuitry 110. Multiplexer 326 can be configured to send as output data from RX gear box 308 or block synchronizer 310.

The output of multiplexer 326 is sent to disparity checker 312 and multiplexer 328. Disparity checker 312 may be included in the receiver circuitry signal path when the Interlaken communication protocol is used in order to monitor and possibly invert bits in a received word (e.g., the last bits, which may be bits[63:0]). The data output from disparity checker 312 is sent to multiplexer 328. Multiplexer 328 can be configured to send as output data from multiplexer 326 or disparity checker 312.

The output of multiplexer 328 is sent to descrambler 314 and multiplexer 330. Descrambler 314 descrambles the data from multiplexer 328 in accordance with a user-specified descrambling protocol. In some embodiments in which receiver circuitry 300 is configured for use with the 10GBASE-R communication protocol, descrambler 314 performs self-synchronous descrambling on the data output from block synchronizer 310. In some embodiments in which receiver circuitry 300 is configured for use with the Interlaken communication protocol, descrambler 314 performs frame synchronous descrambling on the data output from disparity checker 312. The descrambled data is sent to multiplexer 330. Multiplexer 330 can be configured to send as output data from multiplexer 328 or descrambler 314.

The output of multiplexer 330 is sent to frame synchronizer 316 and multiplexer 332. Frame synchronizer 316 may included in the receiver circuitry data path when the Interlaken communication protocol is used in order to lock onto the data by detecting synchronization words in the data stream. Frame synchronizer 316 may make the lock status available to the PLD core circuitry 110. The frame-synchronized data is sent to multiplexer 332. Multiplexer 332 can be configured to send as output data from multiplexer 330 or frame synchronizer 316.

The output of multiplexer 332 is sent to BER monitor 320, decoder and RX SM 318 and multiplexer 334. When receiver circuitry 300 is used in accordance with the 10GBASE-R communication protocol, BER monitor 320 counts the number of synchronization errors within a given period; when that number exceeds a threshold, BER monitor 320 provides a status signal to the PLD core circuitry 110 and/or to other components in receiver circuitry 300. The monitored data may be sent to decoder and RX SM 318. The decoder and RX SM 318 converts the data output from descrambler 314 into appropriately sized data for further transmission and monitors the data for compliance with protocols or standards. For example, in some embodiments, decoder and RX SM 318 convert 66-bit data into 64-bit data and 8-bit control characters and send local fault ordered sets to the PLD core circuitry 110 when BER monitor 320 indicates a high bit error rate condition. Such an embodiment may be used with the 10G BASE-R communication protocol, for example, which includes such control characters. The converted data is sent to multiplexer 334. Multiplexer 334 can be configured to send as output data from multiplexer 332 or 64B/66B decoder and RX SM 318.

The output of multiplexer 334 is sent to CRC32 checker 322 and multiplexer 336. CRC32 checker 322 performs an error check. Such an embodiment may be used with the Interlaken communication protocol, for example, which includes such error checking. The checked data is sent to multiplexer 336. Multiplexer 336 can be configured to send as output data from multiplexer 334 or CRC32 checker 322.

The output of multiplexer 336 is sent to RX FIFO 324. Data from RX FIFO 324 is sent along path 334 to PLD core circuitry 110.

Turning to the transmitter circuitry 350 illustrated in FIG. 3, PCS transmitter circuitry 350*a* includes a transmit ("TX") FIFO 352, a frame generator 354, a CRC32 generator 356, an encoder and TX state machine (SM) 358, a scrambler 360, a disparity generator 362, and TX gearbox circuitry 364, as well as multiplexers 370-378. PMA transmitter circuitry 350*b* includes a serializer 368. Transmitter circuitry 350 receives as input a parallel data signal 270 and a transmitter clock signal 380 from PLD core circuitry 110 (and also uses a parallel clock signal tx_clkout). Transmitter circuitry 350 sends as output a serial data signal 240 to external circuitry.

TX FIFO 352 receives data from PLD core circuitry 110 via data signal 270. Data output from TX FIFO 352 is sent to frame generator 354 and multiplexer 370.

Frame generator 354 encapsulates the payload data and control words from PLD core circuitry 110 and encapsulates these with control words for the framing layer (e.g., synchronization words, scrambler state words, skip words and/or diagnostic words in the metaframe structure of the Interlaken communication protocol). Such an embodiment may be used with the Interlaken communication protocol, for example, which includes such control words. Multiplexer 370 can be configured to send as output data from TX FIFO 352 or frame generator 354.

The output of multiplexer 370 is sent to CRC32 generator 356 and multiplexer 372. CRC32 generator 356 receives data from the frame generator 354 or the TX FIFO 352, calculates the CRC code for each data block, and stores the CRC code in a data field. In some embodiments, the CRC32 generator 356 is included in the TX circuitry path 350 when the TX circuitry path 350 is configured according to the Interlaken communication protocol. The CRC code-augmented data is sent to multiplexer 372. Multiplexer 372 can be configured to send as output data from multiplexer 370 or CRC32 generator 356.

The output of multiplexer 372 is sent to encoder and TX SM 358 and multiplexer 374. In general, the encoder and TX SM 358 encodes data into an appropriate form for further transmission and checks the validity of the encoded data to ensure correct processing and compliance with any protocols or standards. In some embodiments, particularly when implementing the 10GBASE-R communication protocol, the encoder is a 64B/66B encoder which encodes 64-bit data and 8-bit control characters into a 66-bit data block. The TX SM may, for example, check for proper block sequencing. The encoded data is sent to multiplexer 376. Multiplexer 374 can be configured to send as output data from multiplexer 372 or 64B/66B encoder and TX SM 358.

The output of multiplexer 374 is sent to scrambler 360 and multiplexer 376. Scrambler 360 adjusts the data stream to reduce patterns that can cause inter-channel and electromagnetic interference during transmission. Scrambler 360 can operate in one of several user-controllable modes, including frame synchronous mode (appropriate for the Interlaken communication protocol) and self-synchronous mode (appropriate for the 10GBASE-R communication protocol). The scrambled data is sent to multiplexer 376. Multiplexer 376 can be configured to send as output data from multiplexer 374 or scrambler 360.

The output of multiplexer 376 is sent to disparity generator 362 and multiplexer 378. Disparity generator 362 provides a DC-balanced data output and is particularly appropriate for use with the Interlaken communications protocol. The balanced data is sent to multiplexer 378. Multiplexer 378 can be configured to send as output data from multiplexer 376 or disparity generator 362.

The output of multiplexer 378 is sent to TX gear box 364. As discussed above with reference to RX gear box 308, TX gear box 364 is an interface element that adapts data from one data path width to a different data path width (here, the width of the PCS receiver data path to the width of the PMA receiver data path). For example, TX gear box 364 may be a 66:40 gearbox adapts 66-bit data from the PCS sub-layer into 40-bit data in the PMA sub-layer. The resized data is sent to serializer 368. The width of the parallel data path output from TX gear box 364 can vary according to the application. Serializer 368 converts the parallel data output by TX gear box 364 into serial data, and may optionally include a buffer for the output data. Data output from serializer 368 is sent along path 240 to external circuitry.

Control signals can be provided (e.g., using dynamic or static configuration random access memory) to allow the receiver and/or transmitter circuitry to be configured to process the data. For example, these control signals may be provided to PLD 100 during a configuration stage. In such embodiments, PLD 100 may receive configuration data arranged as a programming object file (POF) from an external memory. This external memory may be, for example, Flash memory included in a specialized configuration device or other device, and the POF may be generated by software running on a personal computer or other processing device. The POF includes configuration data from a user or manufacturer that may be used to configure the functionality of PLD 100. The configuration of PLD 100 may occur upon powering up the device, rebooting, or at some other re-programming time. Alternately, or in addition, the control signals may be provided to PLD 100 during a user mode stage, when the device is generally operating based on the logic circuitry that was configured during the configuration stage.

In general, the FIFO circuitry described herein can be configured so as to allow the respective receiver and transmitter circuitry to operate in any of a number of different modes of operation for any of a number of different data transmission functions. For example, the FIFO circuitry can be configured in multiple different modes, including clock compensation mode, asynchronous/deskew mode, phase compensation mode and register mode. Each of these modes, as well as variants and sub-modes of these modes, is described below.

Figure 4:
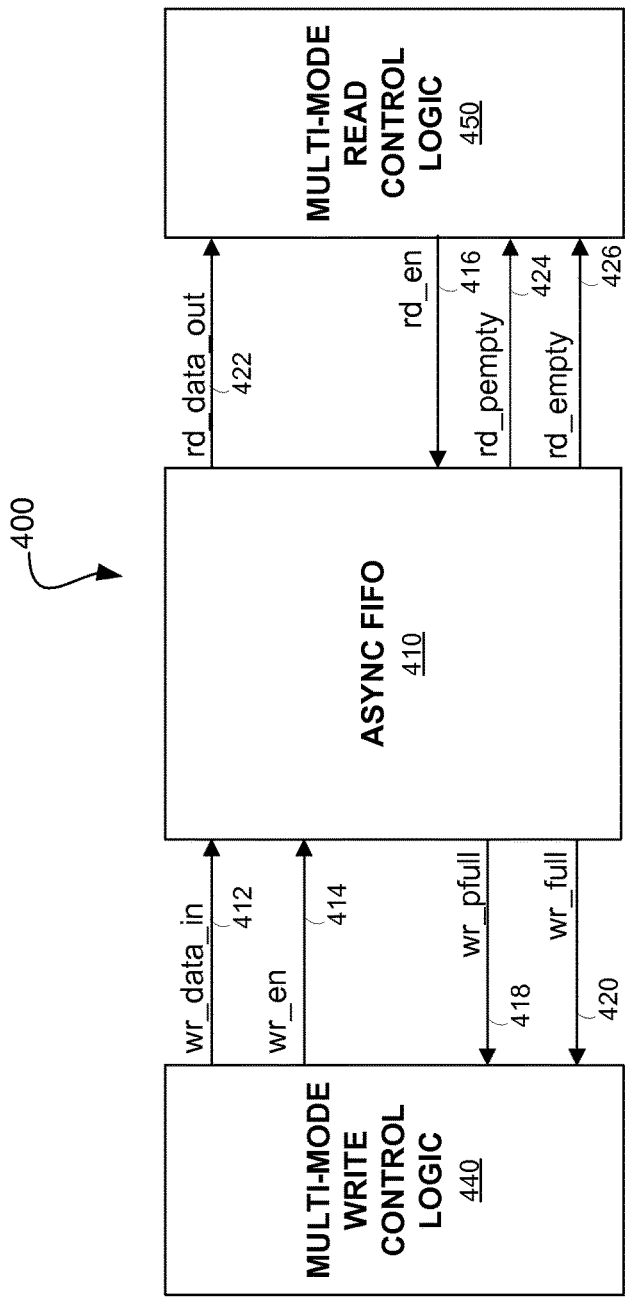
FIG. 4 is a simplified block diagram of communication circuitry including a first-in-first-out (FIFO) circuit, according to an illustrative embodiment.

FIG. 4 is a simplified block diagram of communication circuitry 400 including a first-in-first-out (FIFO) circuit 410 configured as a multi-mode FIFO that can be used in clock compensation mode and other of the modes described herein. Communication circuitry 400 also includes multi-mode write control logic 440 and multi-mode read control logic 450. Read control logic 450 and write control logic 440 may be implemented in specialized block 120 (FIG. 1), in a software module, in external circuitry, or in any combination, for example. Asynchronous FIFO 410 receives a data input signal 412 and a write-enable signal 414 from multi-mode write control logic 440. Asynchronous FIFO 410 also receives a read-enable signal 416 from multi-mode read control logic 450 and transmits a data output signal 422 to read control logic 450. In operation, asynchronous FIFO 410 may transmit status signals to write control logic 440, including a "partially full" signal 418 and a "full" signal 420. Asynchronous FIFO 410 may also transmit status signals to read control logic 450, including a "partially empty" signal 424 and an "empty" signal 426.

Clock Compensation Mode.

In typical high-speed communication systems, a transmitter embeds a clock signal into the transmitted data stream. The receiver has its own receiver clock, and also uses a PLL to recover the transmit clock from the incoming data stream (e.g., as illustrated in FIG. 3 with reference to clock data recovery (CDR) circuitry 304, which recovers clock signal 231). The frequency of various clocks used may depend on the gear box ratio, as discussed above with reference to FIG. 2. When different clock frequencies are used for FIFO read and write operations, a FIFO can become intermittently full or empty, which congests the throughput of the communication system and occasionally causes unpredictable errors. The FIFO may be configured in a clock compensation mode to compensate for clock differences and improve operation. For example, a clock compensation mode FIFO may advantageously compensate for the difference (e.g., as measured in ppm) between an internal clock derived from serial data and a system clock generated within the user design or PLD core circuitry 110. The clock compensation mode configuration described herein may compensate for significant variations of up to +/−100 ppm or greater between the transmit and receive sides of the FIFO.

When the FIFO 410 is configured in clock compensation mode as a RX FIFO or a TX FIFO, read-enable signal 416 or write-enable signal 414, respectively, may be asserted by a user design implemented in the PLD core circuitry 110. In some embodiments, one or more state machines (SMs) can be implemented in the user design in PLD core circuitry 110, in specialized block 120, or in a software module, to insert and/or delete "idle" characters into the bit stream going into and/or out of the FIFO 410, respectively. Such an embodiment may be used with the 10G BASE-R communication protocol, for example, which includes such characters. In some embodiments, a delete SM is configured to delete groups of four idle characters at a time, or one ordered set. The groups or ordered sets may be smaller than the width of the data path. In some embodiments, an insert SM is configured to insert groups of eight idle characters at a time (which may be equal to the width of the data path).

The insertions and/or deletions may take place before or after certain processing operations are performed on the bitstream. For example, several communication protocols use the 64B/66B line code to transform 64-bit data into 66-bit line code (e.g., the 10GBASE-R communication protocol). This encoding achieves DC-balance and helps ensure that enough state changes are present in the bitstream for successful clock recovery. In some embodiments, the insertions and/or deletions take place after the 64B/66B decoding. Other encoding/decoding schemes, such as 8B/10B (as specified in Clause 36 of the IEEE 802.3-2002 Specification), may also be used.

In some embodiments of the clock configuration mode, FIFO 410 may optionally generate insertion and/or deletion flags that indicate when an idle character is inserted and/or deleted, respectively. These flags may not be required for proper operation of the particular communication protocol, but may be useful for debugging and other diagnostic and monitoring purposes. Insertion and deletion flags may be transmitted to the PLD core circuitry 110 or other user-accessible location.

In some custom sub-modes of the clock compensation mode, read-enable signal 416 or write-enable signal 414 may be controlled by the user design implemented in the PLD core circuitry 110. The deletion/insertion symbol may be programmable, and may be customized by the user for a particular application (e.g., based on different data path widths or different protocols). For example, communication applications based on the Interlaken protocol may use a skip character instead of an idle character. In some embodiments, deletions/insertions of the custom character may take place before decoding, and thus the deletions/insertions will result in changes to the encoded bitstream. In such embodiments, the data width of the custom character and the clock frequency may depend on the gear box ratio, as discussed above with reference to FIG. 2.

Asynchronous/Deskew Mode.

Figure 5:
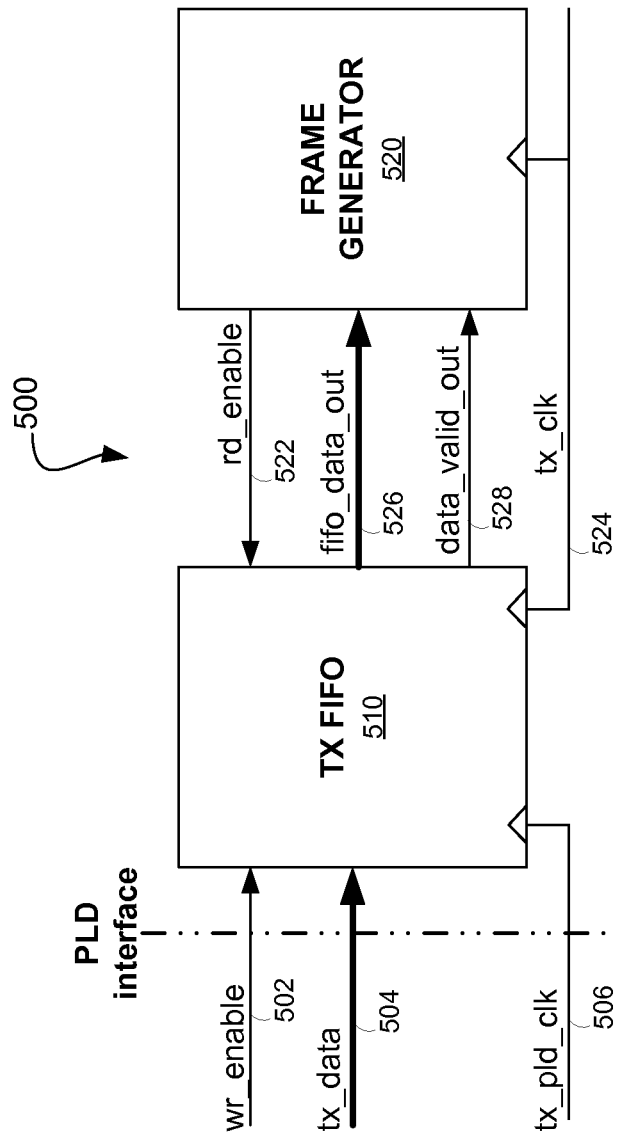
FIG. 5 is a simplified block diagram of a transmit FIFO configured in an asynchronous mode for supporting a communication protocol, according to an illustrative embodiment.

The FIFO circuitry described herein may be configured in an asynchronous/deskew mode, which allows the user to control writing and/or reading to the FIFO in order to avoid a FIFO full or FIFO empty condition. This mode may be used with the Interlaken protocol, in which FIFO full and empty conditions are avoided, and several examples of use of the FIFO in various Interlaken sub-modes are discussed below. One example is illustrated in FIG. 5, which depicts communication circuitry 500 including a TX FIFO 510 configured in an asynchronous/deskew mode for use with a frame-based protocol such as Interlaken. FIFO 510 receives a write-enable signal 502 and a data input 504 from the PLD core circuitry 110. PLD core circuitry 110 monitors the status of FIFO 510 through FIFO flags. FIFO 510 also receives a transmit clock signal 506 from the PLD. FIFO 510 receives a read-enable signal 522 from frame generator 520. Frame generator circuitry is discussed above with reference to FIG. 2; frame generator 520 also shares a clock signal 524 with FIFO 510. In operation, FIFO 510 sends an output data signal 526 to frame generator 520, as well as a data valid signal 528 which may indicate the status of the output data signal 526.

In one embodiment, the FIFO 510 is configured as a transmit FIFO in asynchronous/deskew mode. When the FIFO 510 is so configured, the user (i.e., the PLD) may control the write enable signal. In some embodiments, a user may monitor one or more flags that indicate the status of the FIFO 510 (e.g., a partially-full flag and a partially-empty flag). The user may then control the write enable signal based on these flags. In some embodiments in which the FIFO 510 is used as a transmit FIFO according to an Interlaken protocol sub-mode, the read enable signal may be controlled by an Interlaken Frame Generator inside specialized block 120. The Frame Generator 520 may unpack the data from the FIFO and insert frame control characters into the data stream in order to create Interlaken frames. In such embodiments, reads from the FIFO 510 are stopped while the Frame Generator 520 inserts frame control characters (e.g., SKP characters). Reads from the FIFO 510 may then be resumed to retrieve the frame payload. Another advantage to this configuration is that bonding capability is supported, which provides that the latency is the same across different data channels. Bonding is accomplished by sharing write and read enable signals among the channels. This mode may be particularly suitable for applications that include communication according to the Interlaken protocol, which requires low skews between the channels.

Figure 6:
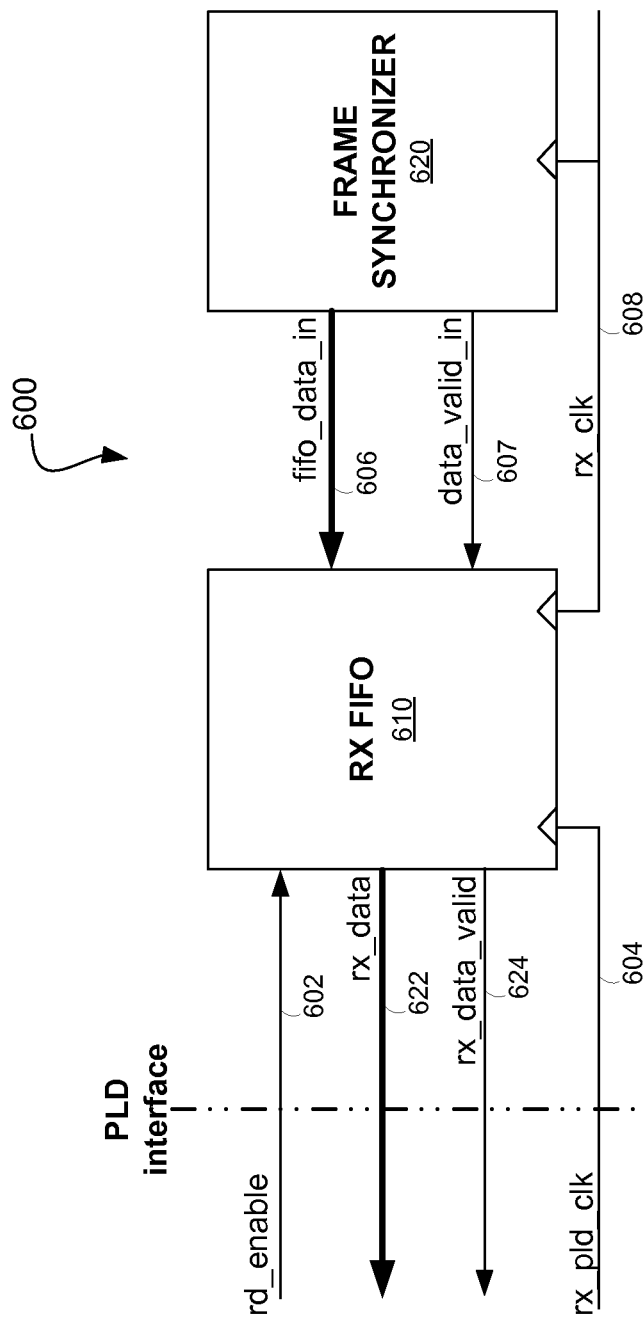
FIG. 6 is a simplified block diagram of a receive FIFO configured in an asynchronous mode for supporting a communication protocol, according to an illustrative embodiment.

On the receive side, FIG. 6 depicts communication circuitry 600 including an RX FIFO 610 configured in an asynchronous/deskew mode for use with a frame-based protocol. FIFO 610 receives a read-enable signal 602 from the PLD core circuitry 110 and receives a clock signal 604 from the PLD. PLD core circuitry 110 monitors the status of FIFO 610 through FIFO flags. FIFO 610 receives a data input signal 606 from frame synchronizer 620, as well as a data valid signal 607 which may indicate the status of the data input signal 606. Frame synchronizer circuitry 620 is discussed above with reference to FIG. 2; frame synchronizer 620 also shares a clock signal 608 with FIFO 610. In operation, FIFO 610 sends an output data signal 622 to the PLD, as well as a data valid signal 624 which may indicate the status of the output data signal 622.

In several embodiments of the asynchronous/deskew mode, various flag signals are generated during operation to indicate the amount of data in the FIFO 510/610 and/or its remaining capacity. Examples of such output flags are illustrated in FIG. 4. For example, partially-full and partially-empty flags may be generated to indicate the status of the FIFO 510/610. Other flags may be generated in addition to or instead of the partially-full and partially-empty flags, such as a full flag, an empty flag, and various flags corresponding to specified levels of full or empty. Moreover, two different signals may be generated for each of these flags: one signal that is synchronized with the write clock, and one signal that is synchronized with the read clock.

In another embodiment, the FIFO 610 is configured as a receive FIFO in asynchronous/deskew mode. When the FIFO 610 is so configured, the user (i.e., the PLD) can control the read enable signal. As described above with respect to the transmit FIFO configuration, some user applications may monitor a partially full flag signal and a partially empty flag signal, and then control the read enable signal based on these flag signals. In some embodiments in which the FIFO 610 is used as a receive FIFO according to an Interlaken protocol sub-mode, the write enable signal may be controlled by an Interlaken Frame Sync inside specialized block 120.

In some embodiments of the asynchronous/deskew mode, the write and read clocks need not run at the same frequency. For example, when the FIFO 510 is configured as a transmit FIFO, the write clock may be advantageously overclocked with respect to the read clock. This feature provides extra flexibility for certain user applications: since the user controls the write enable signal in this asynchronous/deskew mode, the user controls when data may be written to the FIFO 510 and can thereby adjust the data flow in response to the demand on the FIFO 510. In another example, when the FIFO 610 is configured as a receive FIFO, the read clock may be advantageously overclocked with respect to the write clock. This feature provides extra flexibility for certain user applications: since the user controls the read enable signal in this asynchronous/deskew mode, the user controls when data may be read from the FIFO 610 and can thereby adjust the data flow in response to the demand on the FIFO 610.

Figure 7:
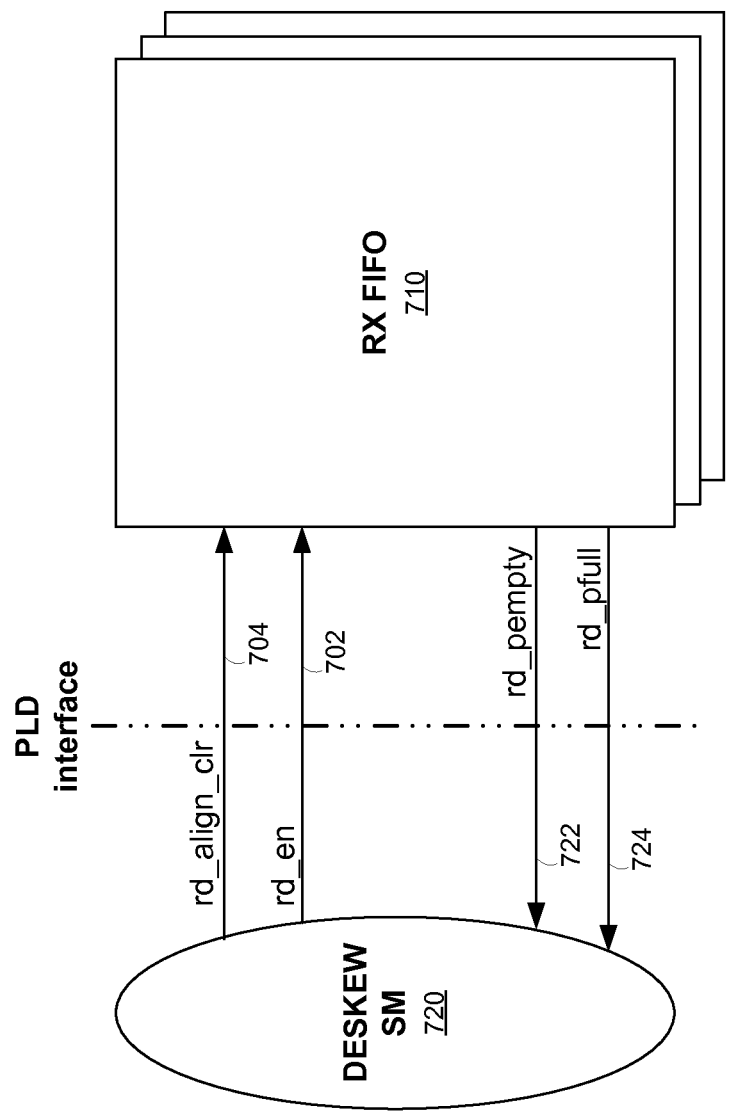
FIG. 7 is a simplified block diagram of a receive FIFO configured in a deskew mode, according to an illustrative embodiment.

In some applications, the data transmitted via multiple channels may skew (become misaligned) during transmission, e.g., when it is sent out on the PMA analog side. Skew may be caused by, for example, transmission line length, temperature, or manufacturing (i.e., process parameters) variations among the data channels. To reduce the skew and improve data alignment, in some sub-modes of the asynchronous/deskew mode, a user may select to configure a FIFO as a deskew FIFO. FIG. 7 is a simplified block diagram of a receive FIFO 710 configured in a deskew mode. Deskew FIFO 710 may be implemented by allowing the user to control the read enable signal 702 as well as reset logic that can generate a reset signal 704 for the FIFO 710. A deskew state machine (SM) 720 for implementing the reset logic functionality may be included in the user design implemented in the PLD core circuitry 110, in specialized block 120, in a software module, or in any other suitable circuitry. Deskew FIFO 710 may send status signals to deskew SM 720, such as "partially empty" signal 722 and "partially full" signal 724. In deskew mode, a write operation to the FIFO 710 in a channel may occur when a sync word is detected in that channel. This is in contrast to a regular Interlaken sub-mode as described above, in which write operations may occur when a data_valid message is received. When sync words have been detected in all channels, all FIFO partially empty flags may be de-asserted. At this time, data from all channels is aligned and a user can begin reading from FIFO 710. If one of the channels becomes partially full before all FIFO partially empty flags are de-asserted, a user may reset all channel FIFOs and each channel may again attempt to detect a sync word. When configured as a deskew FIFO, a FIFO may be sized differently to address different skew requirements for different applications. For example, a deskew receive FIFO may be sized as 32×74b (32 bits in depth by 74 bits in width).

In some embodiments of the deskew mode, various control words may optionally be omitted from being written into the FIFO, so that only the frame payload resides in the FIFO. This functionality is discussed in additional detail below with reference to FIG. 9.

A FIFO may also be configured in a custom sub-mode of the asynchronous/deskew mode. In some embodiments, the FIFO may be configured as a transmit FIFO in an asynchronous mode in which the user controls a write enable signal (e.g., by monitoring the FIFO status through partially full and partially empty flags, as discussed above). In such embodiments, a read enable signal may be controlled by a data_valid generator in specialized block 120. The data_valid generator may control read operations in accordance with a gearbox ratio between the PLD and the PMA. For example, if the ratio between the PLD and PMA data path widths is 64:32, the data_valid generator may cause a data valid signal to go high every other PMA cycle, causing data to be read from the FIFO every other PMA cycle. In some embodiments, the FIFO may be configured as a receive FIFO in an asynchronous mode in which the user controls a read enable signal (e.g., by monitoring the FIFO status through partially full and partially empty flags). In such embodiments, a write enable signal may be controlled by a data_valid generator in specialized block 120, as discussed above. Some applications may advantageously overclock the read side relative to the write side of the FIFO in an asynchronous mode in order to reduce internal latency and/or take advantage of the additional flexibility allowed by the multi-function FIFO described herein.

Phase Compensation Mode.

Configuring a FIFO in a phase compensation mode may be useful when the read and write clocks of the FIFO operate at effectively the same frequency (as discussed below) but offset in phase. One advantage of phase compensation mode is that even when the read and write sides are clocked at different frequencies, read and write operations may effectively operate at the same frequency by using a data_valid generator, as discussed herein. For example, if a transmit FIFO has a 64:32 ratio between the PLD data path width and the PMA data path width, the data_valid generator may cause a data_valid signal line to go high every other PMA clock cycle. In response, data is read from the FIFO every other PMA clock cycle. Thus, even though the read clock is twice as fast as the write clock, reading only occurs every other read cycle, so the write frequency and the effective read frequency are approximately the same.

Another advantage to this configuration is that control-plane bonding is enabled, guaranteeing that the latency is the same across different data channels by tying the read and write enable signals together. This mode may be particularly suitable for applications that include communication according to the SFI-S protocol, which requires low skews between the channels. As described above, the frequency of the PLD side may depend on the gearbox ratio. In some embodiments, a /33 clock may already exist within the PMA, and thus no separate PLD clock need be generator when the data width on the PLD side is a multiple of 33. This reduces the need for a separate general phase-lock loop (GPLL) to generate the PLD clock.

Alternately, when the FIFO is in a phase compensation mode and the read and write sides have the same clock frequency, the FIFO may be configured as a receive FIFO. In some embodiments, a PCS clock drives a PLD clock. Data may be written to the FIFO at every clock cycle. Additionally, data valid bits may be included in the FIFO data stream, tagging along with the associated data and read every clock cycle. This mode may advantageously save GPLL resources by generating a PLD clock from a recovered PCS clock using the known gear box ratio.

Register Mode.

When the FIFO is configured in register mode, only one clock domain is used and data is registered and removed with a deterministic delay. The FIFO may be configured as a receive FIFO or as a transmit FIFO in register mode. When configured as a receive FIFO, the FIFO registers data received and sends it out, resulting in a fixed latency. A data_valid signal is driven by circuitry included in specialized block 120, and tags along with the associated data through the FIFO as described above. This configuration is particularly well-suited for communication protocols which require deterministic latency, such as the Common Public Ratio Interface (CPRI). When configured as a transmit FIFO, the FIFO registers data received and sends it out. A data_valid signal is driven by the PLD, according to the gearbox ratio, when the gearbox input and output widths are not the same.

Figure 8:
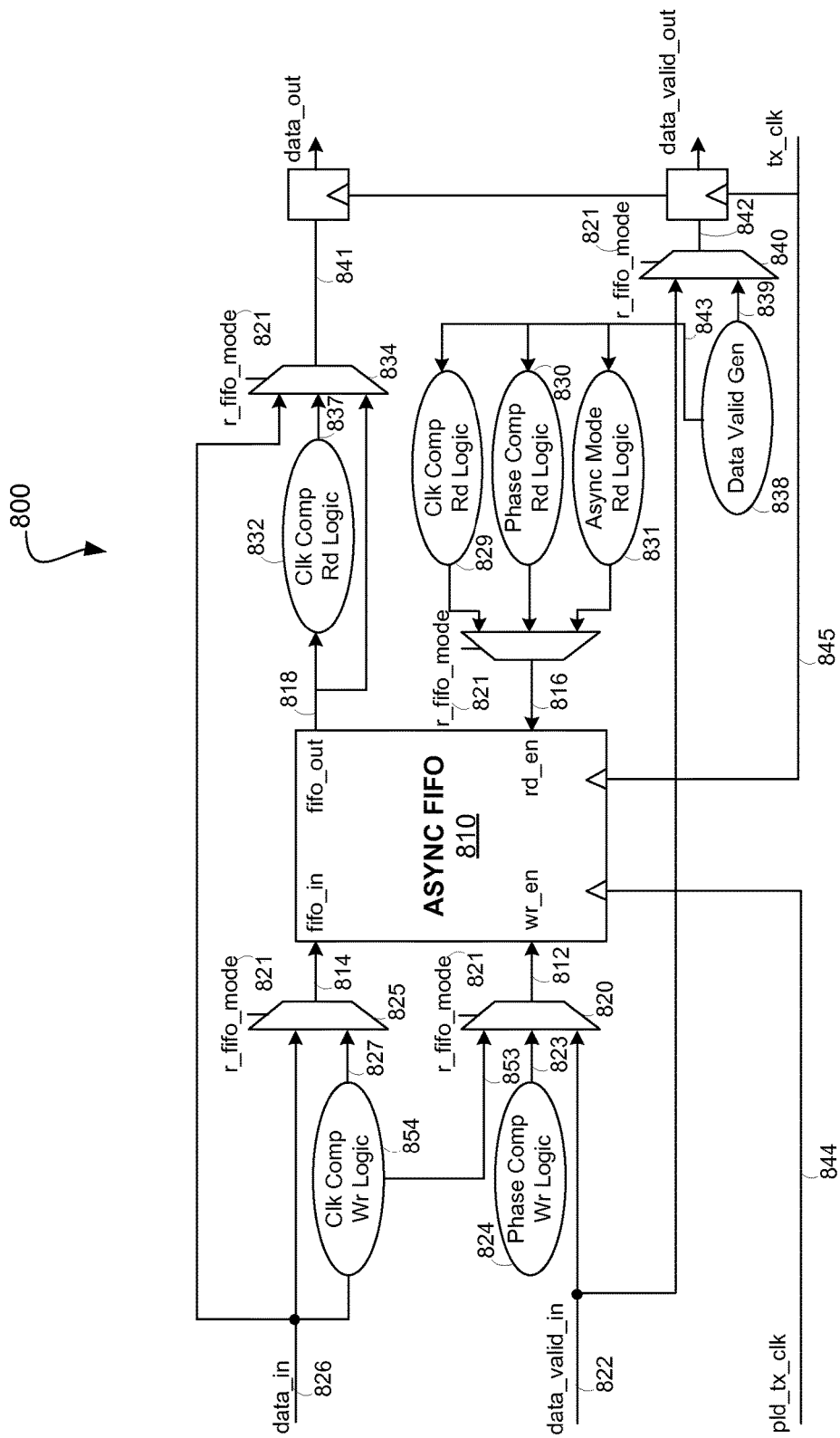
FIG. 8 is a simplified schematic of multi-function transmit FIFO circuitry, according to an illustrative embodiment.

FIG. 8 is a simplified schematic of multi-function transmit FIFO circuitry 800 that may be configured in the operating modes described herein. Depending on the FIFO mode, data going to or coming from the FIFO 810 may be modified, and FIFO read and write enable signals may be controlled differently, as discussed herein. FIFO 810 receives write-enable signal 812, FIFO input data 814 and read-enable signal 816. FIFO 810 sends FIFO output data 818. Write-enable signal 812 is output by multiplexer 820, which is switched by a mode control signal 821 that is generated by the user via the PLD logic or external circuitry. Multiplexer 820 may switch between three input signal lines: a data valid signal 822, a signal 823 generated by phase compensation write logic 824 and a signal 853 generated by clock compensation write logic 854. Thus, the mode control signal 821 controls whether phase compensation write logic 824 or clock compensation write logic 854, or neither, will be used to enable write operations to FIFO 810.

Similarly, the write data signal 814 that is input to FIFO 810 is output by multiplexer 825, which is also switched by mode control signal 821. Multiplexer 824 may switch between two input signal lines: an input data signal 826, and a data signal 827 generated by clock compensation write logic 824. Here, the mode control signal 821 controls whether clock compensation write logic 854 supplies data to FIFO 810. The write side of FIFO circuitry 800 is clocked by the write clock signal 844.

The read side of FIFO 810 is similar to the write side discussed above. Read-enable signal 816 is sent to FIFO 810 from multiplexer 828. Multiplexer 828 is switched by mode control signal 821 and can switch between input signal lines from three sets of mode logic: clock compensation read logic 829, phase compensation read logic 830 and asynchronous mode read logic 831. FIFO output data signal 818 is sent to clock compensation read logic 832 and to multiplexer 834. Multiplexer 834 is switched by mode control signal 821 and can switch between input signal lines from three sources: input data signal 826, a data signal 837 generated by clock compensation read logic 832, and the FIFO output data signal 818. The output of multiplexer 834 is data output signal 841. The read side of FIFO circuitry 800 is clocked by the read clock signal 845.

FIFO circuitry 800 also includes multiplexer 840, which is switched by mode control signal 821. Multiplexer 840 can switch between a signal 839 generated by data valid generator logic 838 and data valid signal 822. The output of multiplexer 840 is data valid output signal 842. The data valid generator logic 838 also generates a signal 843 which is input to clock compensation read logic 829, phase compensation read logic 830 and asynchronous mode read logic 831.

Figure 9:
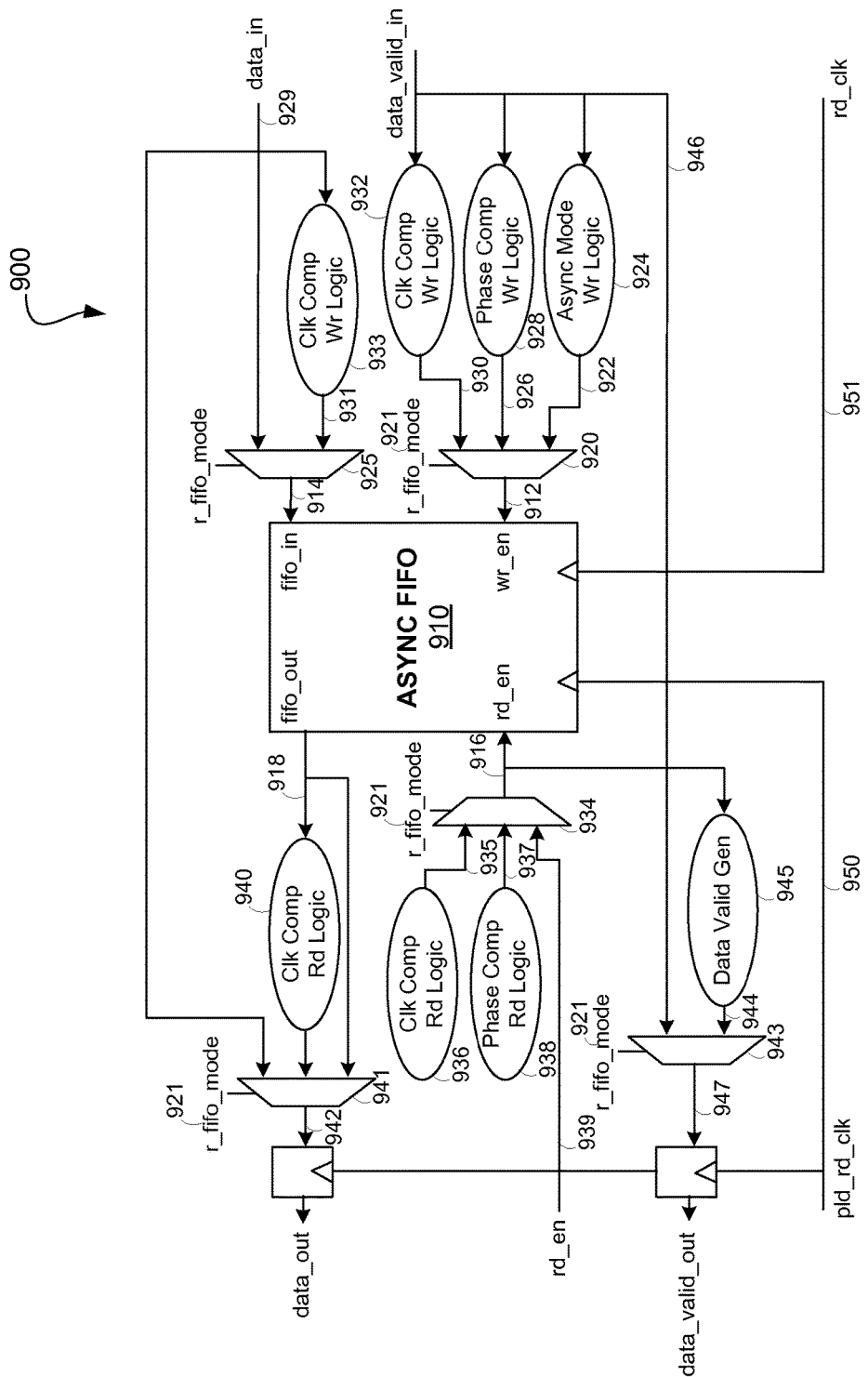
FIG. 9 is a simplified schematic of multi-function receive FIFO circuitry, according to an illustrative embodiment.

FIG. 9 is a simplified schematic of multi-function receive FIFO circuitry 900 that may be configured in the operating modes described herein. FIFO 910 receives write-enable signal 912, FIFO input data 914 and read-enable signal 916. FIFO 910 sends FIFO output data 918. Write-enable signal 912 is output by multiplexer 920, which is switched by a mode control signal 921 that is generated by the user via the PLD logic or external circuitry. Multiplexer 920 may switch between three input signal lines: a signal 922 generated by asynchronous mode write logic 924, a signal 926 generated by phase compensation write logic 928 and a signal 930 generated by clock compensation write logic 932. Thus, the mode control signal 921 controls whether asynchronous mode write logic 924, phase compensation mode write logic 928 or clock compensation mode write logic 932 will be used to enable FIFO 910.

Similarly, the write data signal 914 that is input to FIFO 910 is output by multiplexer 925, which is also switched by custom mode control signal 821. Multiplexer 925 may switch between two input signal lines: an input data signal 929, and a signal 931 generated by clock compensation write logic 933. Here, the mode control signal 921 controls whether data will be supplied to FIFO 910 by the clock compensation write logic 933. The write side of FIFO circuitry 900 is clocked by the write clock signal 951.

The read side of FIFO 910 is similar to the write side discussed above. Read-enable signal 916 is sent to FIFO 910 from multiplexer 934. Multiplexer 934 is switched by mode control signal 921 and can switch between three input signal lines: a signal 935 generated by clock compensation read logic 936, a signal 937 generated by phase compensation read logic 938 and a read enable signal 939 provided by the user. FIFO output data signal 918 is sent to clock compensation read logic 940 and to multiplexer 941. Multiplexer 941 also receives the input data signal 929. Multiplexer 941 is switched by mode control signal 921 and outputs data output signal 942. The read side of FIFO circuitry 900 is clocked by the read clock signal 950.

FIFO circuitry 900 also includes multiplexer 943, which is switched by mode control signal 921. Multiplexer 943 can switch between a signal 944 generated by data valid generator logic 945 and data valid signal 946. The output of multiplexer 943 is data valid output signal 947.

Figure 10:
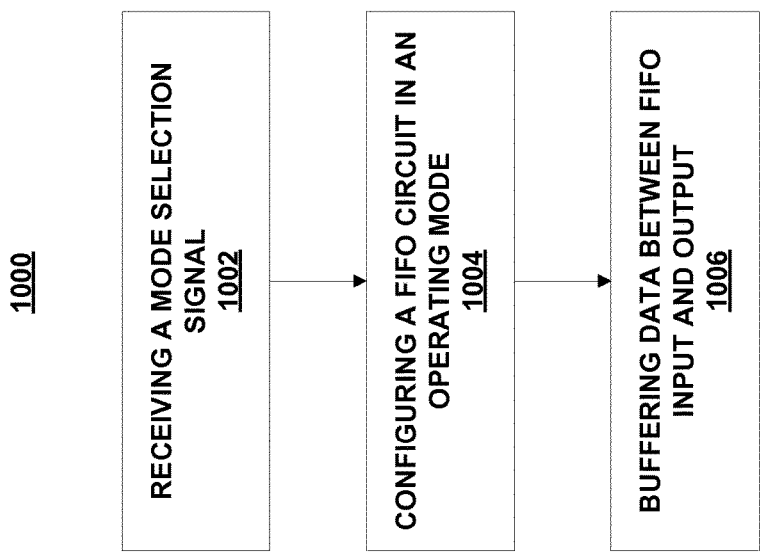
FIG. 10 is a flow chart of illustrative steps performed to buffer data using a FIFO circuit, according to an illustrative embodiment.

The device 100 of FIG. 1 is an exemplary setting in which to apply the techniques disclosed herein for configuring multi-function FIFOs and buffering data using the configured FIFOs. An illustrative embodiment of a technique for buffering data using a multi-function FIFO circuit as described herein is depicted as process 1000 in FIG. 10. This process may be carried out by circuitry included in PLD core circuitry 110, specialized logic block 120, distributed between multiple processing locations within device 100, and may be implemented singly or in combination with other communication and processing techniques. In practice, one or more steps shown in process 1000 may be combined with other steps, performed in any suitable order, performed in parallel (e.g., simultaneously or substantially simultaneously), or removed. Process 1000 may be implemented using any suitable combination of hardware and/or software in any suitable fashion.

At step 1002, a mode selection signal is received. In some embodiments, the mode selection signal is transmitted in a configuration data stream. In some embodiments, the mode selection signal is a control signal transmitted from PLD core logic circuitry 110 (FIG. 1) or from other user circuitry within or separate from PLD 100. In some embodiments, the mode selection signal is the custom mode signal 821 of FIG. 8 or the custom mode signal 921 of FIG. 9, or any other control signal or signals that configures any of the multiplexer or other configurable elements in the multi-function FIFOs described herein. In some embodiments, the mode selection signal is transmitted by hardware or software in a general purpose computer that is in communication with PLD 100 or other circuitry implementing a multi-function FIFO as described herein. The mode selection signal may be transmitted wirelessly or though a wired connection, and may be received and processed by any of a number of intermediate processing devices before the mode selection signal is used as a basis for configuring the FIFO circuitry.

At step 1004, a FIFO circuit is configured in an operating mode. The way that step 1004 is performed, as well as the operating mode in which the FIFO circuit is configured, may be responsive to the mode selection signal. The operating mode may be any of the operating modes or sub-modes described herein, including a clock compensation mode, an asynchronous/deskew mode, a phase compensation mode, or a register mode. In some embodiments, the operating mode is associated with a high-speed communications protocol. The protocol may be a standard protocol (such as 10GBASE-R or Interlaken) or a custom protocol defined by a user. In some embodiments, the FIFO circuit is provided on a specialized logic block on a programmable logic device. In some embodiments, the FIFO circuit is provided by hardwired circuitry on a separate device.

At step 1006, the FIFO circuit is used to buffer data between a FIFO input and a FIFO output according to the operating mode (as configured in step 1004). In some embodiments, the data is buffered according to a high-speed communications protocol, such as 10GBASE-R or Interlaken. Other communication protocols that may be used with the FIFO circuits described herein include SFI-S, CPRI, SATA, FC and many non-industry-standard protocols that are modifications of industry-standard protocols.

Figure 11:
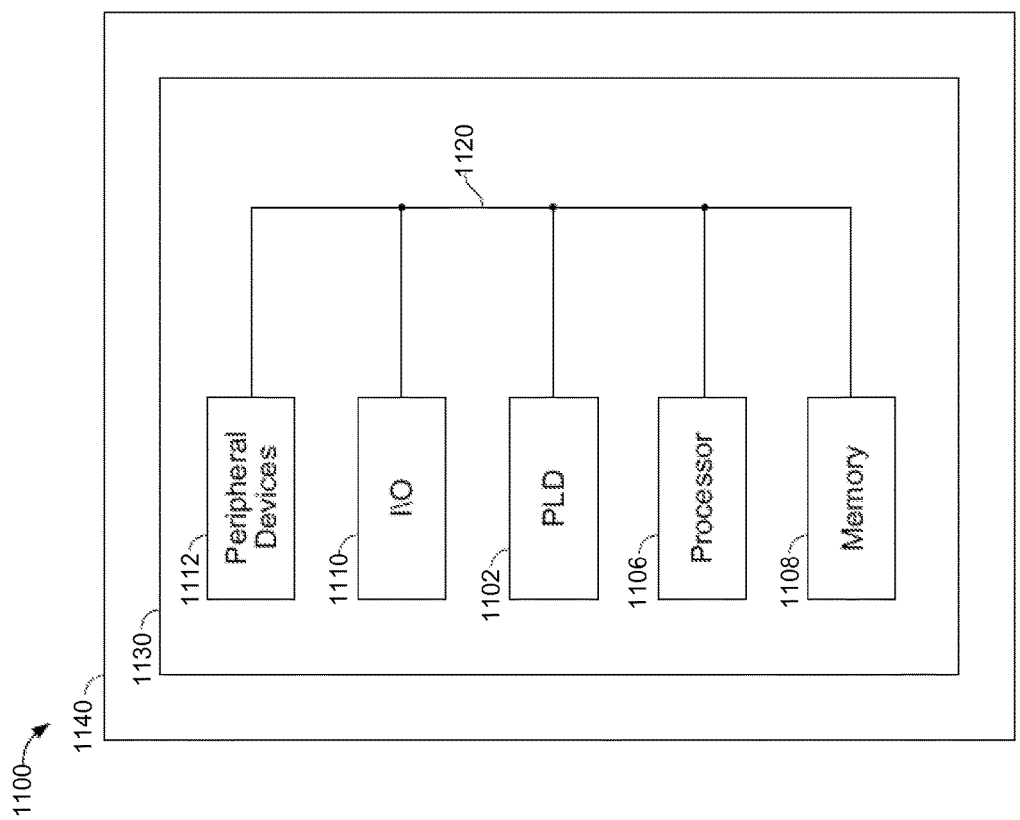
FIG. 11 is a simplified block diagram of an illustrative system employing a programmable logic device incorporating an embodiment of a FIFO disclosed herein.

FIG. 11 illustrates a PLD 1102 or other device (e.g., ASSP, ASIC, full-custom chip, dedicated chip) which includes embodiments of the multi-function FIFO circuits described herein within a data processing system 1100. Data processing system 1100 can include one or more of the following components: a processor 1106, memory 1108, I/O circuitry 1110, and peripheral devices 1112. These components are coupled together by a system bus or other interconnections 1120 and are populated on a circuit board 1130 which is contained in an end-user system 1140.

System 1100 can be used in a wide variety of applications, such as computer networking, data networking, instrumentation, video processing, digital signal processing, or any other application where the advantage of using programmable or reprogrammable logic is desirable. PLD 1102 can be used to perform a variety of different logic functions. For example, PLD 1102 can be configured as a processor or controller that works in cooperation with processor 1106. PLD 1102 may also be used as an arbiter for arbitrating access to a shared resource in system 1100. In yet another example, PLD 1102 can be configured as an interface between processor 1106 and one of the other components in system 1100. It should be noted that system 1100 is only exemplary, and that the true scope and spirit of the invention should be indicated by the following claims.

It will be understood that the foregoing is only illustrative of the principles of the invention, and that various modifications can be made by those skilled in the art without departing from the scope and spirit of the invention. One skilled in the art will appreciate that the present invention can be practiced by other than the described embodiments, which are presented for purposes of illustration and not of limitation, and the present invention is limited only by the claims that follow.

What is claimed is:

1. A data buffering apparatus comprising:
a mode selection input for receiving a mode selection signal within a configuration data stream transmitted from core circuitry;
a first-in-first-out (FIFO) circuit that is operative to buffer a data signal received at an input terminal of the FIFO circuit, wherein the FIFO circuit is configurable in an operating mode, wherein the mode selection signal results in selection of the operating mode from at least three available operating modes, the available operating modes comprising a clock compensation mode, a phase compensation mode, and a register mode, and wherein the register mode provides a deterministic latency for the FIFO circuit, wherein in the phase compensation mode, a clock of the FIFO operates at an effectively same frequency as a clock of the data signal, wherein the effectively same frequency comprises a frequency of reading from the FIFO circuit, a frequency of writing to the FIFO circuit, or both, based on a data valid signal indicative of a status of the data signal, the clock of the FIFO circuit, or both, and wherein, in the clock compensation mode, the FIFO circuit inserts or deletes at least one character in the data signal; and
multiplexor circuitry that receives the mode selection signal and selects the operating mode of the FIFO circuit from the at least three available operating modes based on the mode selection signal to control a write enable signal or a read enable signal to the FIFO circuit based on logic of the selected operating mode.

2. The data buffering apparatus of claim 1, wherein the FIFO circuit is configured according to the clock compensation mode to insert a user-selectable insertion character into the data signal.

3. The data buffering apparatus of claim 1, wherein the FIFO circuit is configured according to the clock compensation mode to delete a user-selectable character from the data signal.

4. The data buffering apparatus of claim 1, wherein the available operating modes includes an asynchronous mode.

5. The data buffering apparatus of claim 4, wherein the FIFO circuit is configured according to the asynchronous mode to provide low skew alignment for a multi-channel communication protocol.

6. The data buffering apparatus of claim 1, wherein the available operating modes include a deskew mode.

7. The data buffering apparatus of claim 6, wherein the FIFO circuit is configured according to the deskew mode to remove control words from a data frame within the data signal prior to buffering the data signal.

8. The data buffering apparatus of claim 1, wherein the FIFO circuit is configured according to the phase compensation mode to buffer the data signal according to a write clock and a read clock, wherein the read and write clocks operate at the substantially same frequency.

9. The data buffering apparatus of claim 1, wherein the FIFO circuit is configured according to the phase compensation mode to provide low skew alignment for a multi-channel communication protocol.

10. The data buffering apparatus of claim 1, wherein the FIFO circuit is configured according to the phase compensation mode in which the clock of the FIFO operates at a same frequency as an internal clock of the data signal operates at a same frequency or an effectively same frequency as the clock of the FIFO.

11. A programmable logic device comprising:
programmable logic device core circuitry;
a specialized logic block for supporting a plurality of communications protocols, wherein the specialized logic block is coupled to the programmable logic device core circuitry, wherein the specialized logic block comprises first-in-first-out (FIFO) circuitry that is configurable in an operating mode and is operable to buffer a data signal according to at least one of the plurality of communications protocols, wherein a mode selection signal used to configure the FIFO circuitry is received within a configuration data stream transmitted from the core circuitry, wherein the mode selection signal results in selection of an operating mode for the FIFO circuitry from at least three available operating modes, the available operating modes comprising a clock compensation mode, a phase compensation mode, and a register mode, and wherein the register mode provides a deterministic latency for the FIFO circuit, wherein, in the phase compensation mode, a clock of the FIFO operates at an effectively same frequency as a clock of the data signal, wherein the effectively same frequency comprises a frequency of reading from the FIFO circuit, a frequency of writing to the FIFO circuit, or both, based on a data valid signal indicative of a status of the data signal, the clock of the FIFO circuit, or both, and wherein, in the clock compensation mode, the FIFO circuit inserts or deletes at least one character in the data signal; and
multiplexor circuitry that receives the mode selection signal and selects the operating mode of the FIFO circuit from the at least three available operating modes based on the mode selection signal to control a write enable signal or a read enable signal to the FIFO circuit based on logic of the selected operating mode.

12. The programmable logic device of claim 11, wherein the plurality of communications protocols includes 10GBASE-R and Interlaken.

13. The programmable logic device of claim 11, wherein the FIFO circuitry is operable to buffer the data signal according to read and write clocks, wherein the read and write clocks operate at different frequencies.

14. The programmable logic device of claim 11, wherein the FIFO circuitry is operable to buffer the data signal according to read and write clocks, wherein the read and write clocks operate at substantially the same frequency.

15. A method for buffering data comprising:
receiving a mode selection signal within a configuration data stream transmitted from core circuitry;
selecting, via multiplexor circuitry, an operating mode of a first-in-first-out (FIFO) circuit from at least three available operating modes based on the mode selection signal to control a write enable signal or a read enable signal to the FIFO circuit based on logic of the operating mode selected;

configuring the first-in-first-out (FIFO) circuit in an operating mode selected from the at least three available operating modes responsive to the mode selection signal, the available operating modes comprising a clock compensation mode, a phase compensation mode, and a register mode, wherein the register mode provides a deterministic latency for the FIFO circuit, wherein, in the phase compensation mode, a clock of the FIFO operates at an effectively same frequency as a clock of the data signal, wherein the effectively same frequency comprises a frequency of reading from the FIFO circuit, a frequency of writing to the FIFO circuit, or both, based on a data valid signal indicative of a status of the data signal, the clock of the FIFO circuit, or both, and wherein, in the clock compensation mode, the FIFO circuit inserts or deletes at least one character in the data signal; and with the FIFO circuit, buffering data, received at the FIFO circuit, according to the operating mode, wherein the multiplexer circuitry selects the operating mode for the FIFO circuit from at least a group comprising the clock compensation mode, the phase compensation mode, and the register mode based on the mode selection signal.

16. The method of claim 15, wherein a component block on a programmable logic device comprises the FIFO circuit.

17. The method of claim 15, wherein the mode selection signal is within a configuration data stream being received.

18. The method of claim 15, wherein the operating mode is associated with a high-speed communications protocol, and the data is buffered according to the high-speed communications protocol.

19. The data buffering apparatus of claim 15, comprising a data valid generator that adapts a data path width of at least one of the data signal and the clock of the FIFO based on a gearbox ratio between the data signal and the clock of the FIFO, and generates the data valid signal indicating a status of the data signal or the clock of the FIFO.

* * * * *